July 11, 1939.  E. F. JACKMAN  2,165,485

DRILL GUIDE

Filed Dec. 12, 1936

INVENTOR.
ELMER F. JACKMAN
BY
ATTORNEYS

Patented July 11, 1939

2,165,485

UNITED STATES PATENT OFFICE 2,165,485

DRILL GUIDE

Elmer F. Jackman, Elyria, Ohio, assignor to The Ridge Tool Company of Elyria, Ohio, North Ridgeville, Ohio, a corporation of Ohio Application December 12, 1936, Serial No. 115,573

4 Claims. (Cl. 77—62)

This invention relates to improvements in devices for preparing broken stud bolts or the like for extraction by screw extractors, and more particularly to a guide for drilling holes in stud bolts.

Stud bolts often break off during removal, leaving a threaded portion in the hole which must be removed before a new stud can be applied. The usual practice consists in drilling a hole in the broken stud after which an extractor is driven into the hole and then the extractor turned and the stud unscrewed from the hole. It may readily be seen that the hole should preferably be in the axis of the stud and this invention concerns itself particularly with locating such hole axially. Heretofore the end of the stud was usually center punched to start the hole but in many instances the stud was so deep in the hole that it was not possible to determine the center. Attempts to drill the hole did not permit the drill to become centered due to the rough broken surface without first punching or using a drill guide.

In the present invention I have provided a device which is readily adapted to bolt holes of various sizes and depths and wherein the drill can be quickly positioned to drill a hole in the axis of the stud. Certain other features such as economy in manufacture and the provision of a device adaptable to many sizes of holes with a minimum number of parts as well as the invention itself, will become more apparent from the following description of an embodiment thereof, which description is illustrated by the accompanying drawing.

Figures 1, 2:
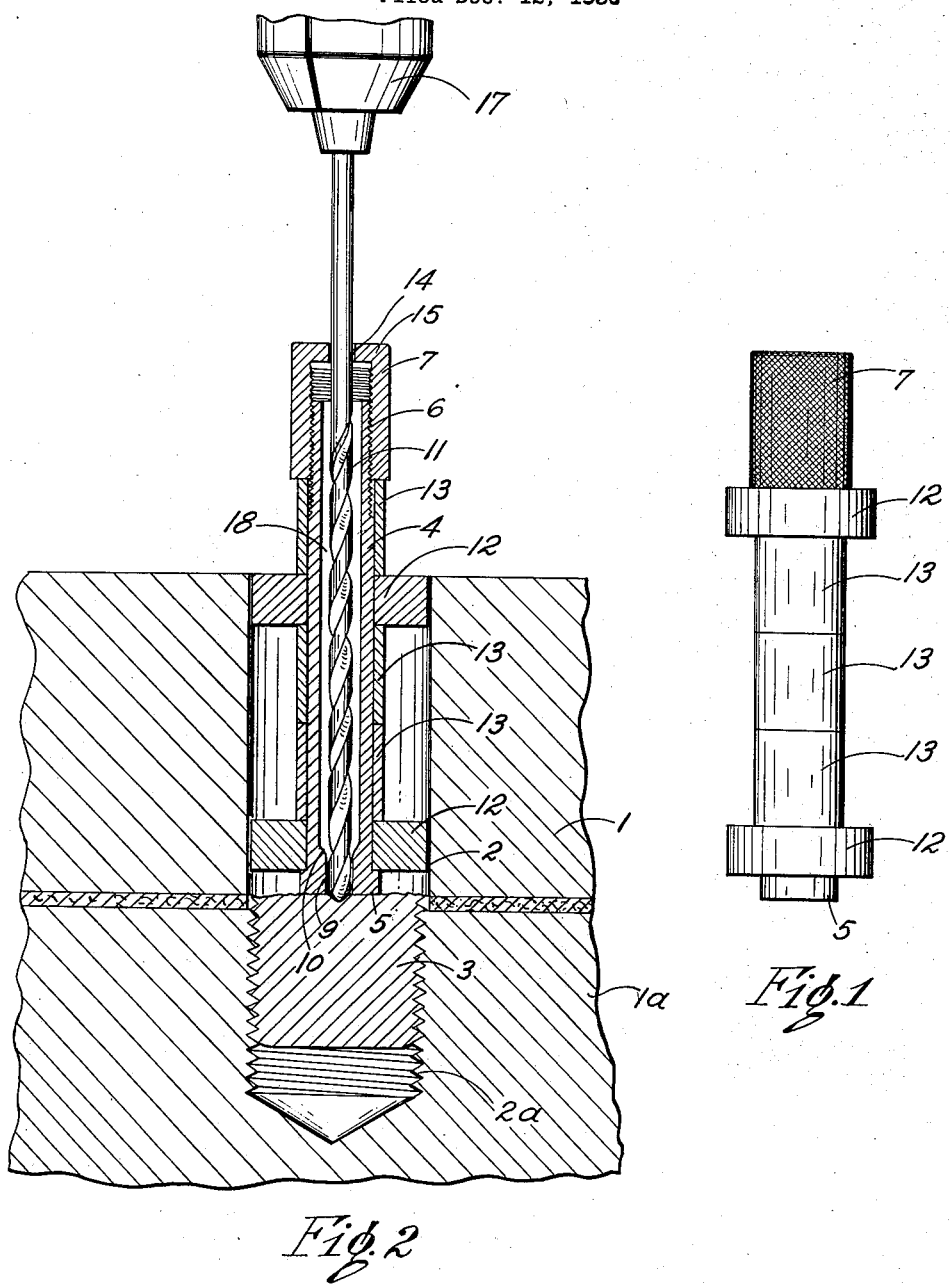
Fig. 1 is an elevational view of my device.
Fig. 2 is a vertical medial sectional view thereof illustrating the manner of using the same.

Referring now to the drawing throughout which like parts are designated by like reference characters, 1 represents a block of metal such as a cylinder head and having a bore 2. 1a is the cylinder block having a threaded bore 2a in which the broken end of a stud bolt 3 is lodged and which it is desirable to remove without removing the head.

The drill guide includes a cylindrical shank 4 which terminates at its lower end in an annular flange or head 5. The other end is threaded at 6 to receive a cap 7. The shank has an axial bore 18 extending throughout most of its length and connecting with an end bore 9 of reduced size at the bottom end by a tapered wall 10. The end bore is of sufficient size to permit easy insertion and yet guide a drill 11.

A pair of collars 12 are telescopically disposed upon the shank 4 and are held in the desired position on the shank by spacers 13. The spacers and collars are locked in the desired position by the cap 7 which is provided with a drill guide aperture 14 in its upper end wall 15.

In practice I have found that the collars may be made in various diameters to allow the device to be used in threaded holes of various sizes, it being merely necessary to substitute the desired size.

In operation, the size and depth of the hole from which a broken stud is to be removed being determined, a pair of the collars are selected which fit snugly but not tight in the hole. One collar is then placed on the shank 4 and the other collar is then placed on the shank being spaced from the first collar by spacers 13 at a point at or as near as possible to the top of the hole, which of course is determined by the position of the broken part in the hole. The remaining spacers are then put on the shank and the entire assembly held together by the cap 7. The assembly is then placed in the hole with the end 5 resting on the end of the broken stud. A drill is then selected, of a diameter that permits easy and yet snug insertion through the cap guide hole 14 and bottom guide hole 9, having been first attached to a suitable chuck 17 of a drill or brace. The tapered wall between the large and small portions of the bore serves to guide the drill to the small bore and provide drill chip clearance.

The drill is then operated to drill a hole down into the broken stud. This hole may extend entirely or partially through the stud.

After the hole is drilled the guide and drill are removed. The chips from the drill will accumulate in the space 18 formed by the large bore and will be removed with the drill guide.

The guide hole being made, a larger drill may now be used to drill the hole in the stud to the desired size, after which an extractor may be applied and the stud removed by unscrewing the same.

By the device of my invention I am able to drill holes that are in substantially the center of the stud and therefore the hole can be made relatively large without mutilating the threads, which would be the case if a large drill were used and it was off-center. This leaves a thin flexible threaded shell which may be easily removed by extractors of the type shown in my co-pending application Serial No. 88,425, filed July 1, 1936, Patent No. 2,121,197 of June 21, 1938.

Having thus described my invention, I am aware that numerous and extensive departures may be made therefrom and without departing from the spirit of the invention.

I claim:

1. In a drill guide, a shank, said shank formed to provide an axial bore therein comprising an enlarged bore through most of the shank and a small bore at the lower end with a tapered wall connecting the large bore to the smaller bore, centering collars for supporting and centering said shank in a threaded aperture, spacers for determining the longitudinal position of said centering collars, a cap for holding the spacers and collars on said shank and having an upper drill guide bore.

2. In a device of the class described, a tubular drill guide having a flange on one end and the other end threaded, a plurality of spacers and bushings disposed on the guide, said bushings adapted to center the guide in a hole, and said spacers adapted to hold the bushings in spaced alignment on the guide, a nut, for holding the spacers and bushings in position, disposed on the threaded end of the guide.

3. In a device of the class described, a drill guiding member including a cylindrical shank having an axial bore, said shank having a head on one end and the other end threaded, the bore adjacent the headed end having a re-entrant wall with an axially aligned aperture, bushings disposed on the shank for aligning the same in an aperture, spacers on the shank for holding the bushings in longitudinally adjusted position, a nut for the threaded end to hold the spacers and bushing in fixed position, the end of the nut having a re-entrant wall with an aperture disposed in alignment with the aperture in the end of the shank.

4. In a device of the class described, a drill guide including a cylindrical shank having one end threaded and the other end provided with a head, said guide formed to provide a relatively large bore throughout most of its length and terminating at the headed end in a smaller bore of a size sufficient to permit a drill to pass easily therethrough, a screw threaded cap for the end of the shank and having an aperture in its end wall substantially the same size as the bore in the headed end of said shank and adapted to be in axial alignment therewith when the cap is in position, means to hold said guide in a central position in a hole, comprising a pair of guides telescopically disposed on said shank and a plurality of spacers cooperable with the guides about the shank to hold the guides in desired position, said cap adapted to hold the spacers and cylinders in adjusted position and said large bore adapted to receive the drill chips and the smaller bores to guide the drill.

ELMER F. JACKMAN.